June 11, 1974  P. G. LAHAYE ET AL  3,816,595
METHOD AND APPARATUS FOR REMOVING NITROGEN
OXIDES FROM A GAS STREAM
Filed Nov. 15, 1971
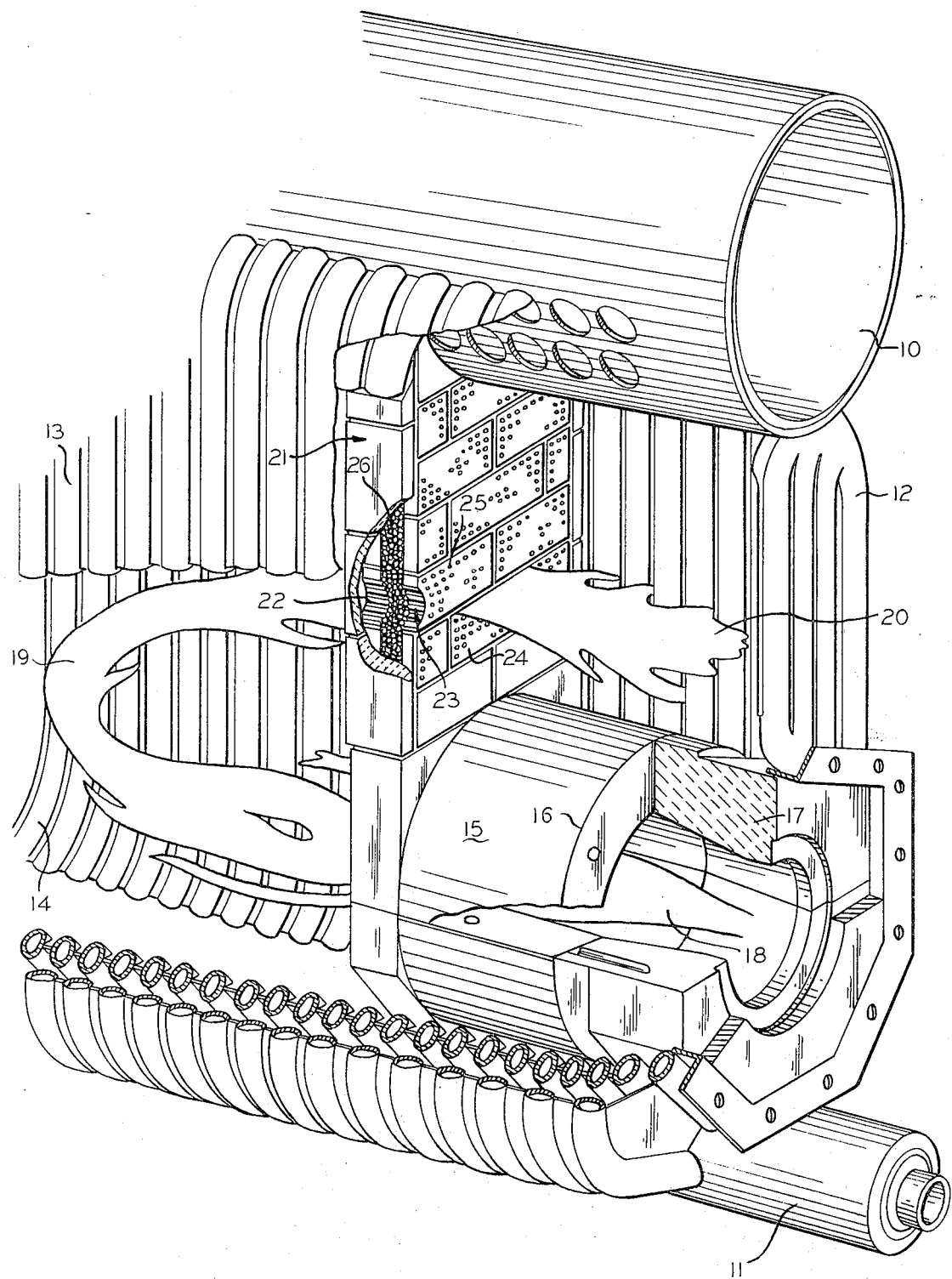

Patented June 11, 1974

3,816,595

METHOD AND APPARATUS FOR REMOVING NITROGEN OXIDES FROM A GAS STREAM
Paul G. LaHaye, Cape Elizabeth, Maine, and Glenn D. Craig, Menomonee Falls, and Joseph L. Turecek, Shorewood, Wis., assignors to Aqua-Chem, Inc.
Filed Nov. 15, 1971, Ser. No. 198,767
Int. Cl. B01d 53/34
U.S. Cl. 423—239
7 Claims

ABSTRACT OF THE DISCLOSURE

Nitrogen oxides are separated from a hot gas mixture by placing the mixture in contact with a silicon compound such as silicon carbide.

BACKGROUND OF THE INVENTION

It is well known that combustion gases contain oxides of certain non-metallic elements such as sulphur and nitrogen and that these oxides are a major source of noxious atmospheric pollution. Nitrogen oxides are present in gaseous combustion products since nitrogen is always present in the air used for combustion. The heavy hydrocarbon fuels also often contain nitrogen compounds which are converted to oxides in the combustion process. Gasoline engines, diesel engines, fuel fired hot water heaters, residential and commercial furnaces and boilers of all types are typical of apparatus whose exhaust or flue gases have rather high concentrations of nitrogen oxides. The various combustion control techniques which have been used heretofore have not been satisfactory for meeting the current pollution standards respecting nitrogen oxide emissions. Moreover, methods for reducing nitrogen oxides from gaseous combustion products have not been satisfactory because they are usually carried out at the expense of reducing the efficiency of the combustion process.

SUMMARY OF THE INVENTION

In general terms, the present invention involves passing gaseous combustion products or gas effluents over or through a reactive matrix of silicon carbide, or other silicon compounds. At elevated temperatures, the nitrogen oxide in the gas stream react with the silicon carbide to form non-gaseous oxides and nitrides which are occluded in or on the carbide.

It is a general object of this invention to provide a method and means for removing pollution causing noxious non-metallic oxides from various gaseous effluents. Another object is to provide a new form of reactive filter for selective removal of certain non-metallic oxides and, particularly, nitrogen oxides from gaseous effluents.

Yet another object is to provide nitrogen oxide filtering means which may take many forms and are readily adaptable to employment in combustion apparatus such as engines, boilers, hot water heaters, residental and commercial furnaces, power generating boilers, gas turbines and other combustion apparatus, which burn liquid, gaseous or solid fuels such as oil, gas, and coal.

How the foregoing and other more specific objects are achieved will appear in the detailed description of an embodiment of the invention which will be set forth shortly hereinafter in reference to the drawing.

DESCRIPTION OF THE DRAWING

The drawing shows the principal elements of a boiler which incorporates the new filter.

DESCRIPTION OF A PREFERRED EMBODIMENT

The term filter as used herein for convenience means a reactive filter as distinguished from the common use of the word filter which ordinarily implies separation of suspended solids from a fluid with a filter medium. A filter in accordance with the invention separates gases from a mixture thereof by some phenomena other than simple physical capture of the filtrate.

The drawing shows a boiler with parts broken away to illustrate how the new filter is incorporated in the combustion chamber thereof. The refractory lined housing of the boiler has been omitted for the sake of clarity.

The boiler comprises an upper drum 10 which connects with a lower feed water drum 11 by means of a plurality of water-filled tubes such as the groups of tubes 12, 13 and 14. In the front lower region of the boiler volume defined by the tubes there is a cylindrical burner chamber 15 which is conventional and is characterized by a cylindrical metal shell 16 lined with refractory material 17. At the front end of the burner chamber 15 is a typical circular aperture 18 in which a burner, not shown, is normally installed. The burner may be any conventional type which is adapted for burning gaseous or liquid hydrocarbon fuels. The boiler might also be fired with solid fuel such as coal in which case the combustion chamber 15 would be appropriately modified. It is only important for the purposes of the invention to demonstrate that fuel combines with air in combustion chamber 15 to produce hot gaseous combustion products in chamber 15 which are designated by the reference numeral 18 as a stream of gas in this example. The gaseous combustion products 18 usually comprise carbon monoxide, carbon dioxide, sulphur dioxide and various nitrogen oxides together with relatively small amounts of other compounds.

A continuation of the hot combustion gas stream is marked 19 and is seen in the drawing to flow rearwardly into the space defined by the water-filled heat exchange tubes such as 13 and 14. Gas stream 19 loops back and continues as stream 20 which may be directed to an exhaust stack, not shown. Generally the stream of hot gases 19 is reduced in temperature due to heat lost by radiation, convection and conduction to the heat exchange tubes in the boiler.

In accordance with the invention, a reactive filter assembly, generally designated 21, is disposed within the boiler in the combustion gas path so that the combustion gases flow through the filter on their way to exhaust. The filter assembly 21 in this example comprises a chamber whose rear wall 22 and front wall 23 are made up of refractory blocks such as 24 which have a plurality of small perforations 25 in them to provide a gas flow path from the rear to the front of the boiler. The space between perforated front and rear walls 22 and 23 of filter assembly 21 is occupied by a matrix of granulated silicon carbide 26. All of the combustion gases flow through or in contact with the matrix. The silicon carbide captures on its surface a large proportion of the nitrogen oxides in the combustion gases. The precise reactions and mechanisms by which the nitrogen oxides are captured are not fully understood at this juncture but it is clear from gas analyses on both the input and output sides of the filter assembly that the total of all nitrogen oxides present in the combustion gases is markedly reduced on the output side of the filter and that the individual oxides of nitrogen including nitrous oxide, nitric oxide, nitrogen trioxide, nitrogen dioxide, nitrogen tetroxide, and nitrogen pentoxide are also reduced.

In this illustrative embodiment, the combustion gases are channeled through the reactive matrix or bed 26 of granulated silicon carbide by means of holes in both faces of filter assembly 21. The filter may be designed in other ways, however, without sacrificing the high active surface to volume ratio which prevails in the granular design. For instance, the reactive filter may be comprised of silicon carbon tubes with small bores bundled together so as to provide a myriad of axial gas flow passages on the insides of the tubes and on the outsides as well in the spaces which are created by the tubes being in tangential contact. The tube bundle may also be comprised of hexagon silicon carbide tubes arranged in honeycomb fashion with adjacent sides in contact. A filter comprised of a tubular matrix has the merit of offering design flexibility since tubes of various inside and outside diameters, thicknesses and lengthes may be used in different circumstances in which case gas pressure drop in the filter assembly may be predetermined and controlled more readily. In some applications, where the pressure drop across the filter is of less consequence, the silicon carbide matrix may constitute a panel in which small crystals thereof are bonded to each other so as to create a porous matrix of high surface area to volume ratio. Generally speaking, any matrix or conglomeration of reactive silicon carbide which is porous or foraminous, if it is a flow-through filter type, or is rough, if it is a surface contact filter type, may be used.

In a reactive filter assembly which was situated in the combustion gas stream of a small boiler combustion chamber, granulated silicon carbide of the beta crystalline structure type was used. It was found to be a very effective remover of nitrogen oxides from combustion gases which traversed it. The granules were composed of fine crystals and were not processed in any other way than crushing the larger chunks of carbide which come from the electric furnace to an appropriate size. The granules were very irregular and highly porous as evidenced by their relatively low density. In one case, a loosely compacted matrix or bed a few inches thick was employed and the granules were about ½ inch thick on an average. This is merely exemplary and by no means exclusive since grain size and matrix thickness will always be governed by the conditions in which the filter is employed.

Although, as indicated earlier, the exact mechanism by which nitrogen oxides are captured by the silicon compound is not certain at this time, one may speculate that it may be an adsorption process, or it may be that the compound catalyzes dissociation of nitrogen and oxygen or it may be that there is a complex reaction between silicon carbide and nitrogen oxides which results in on-volatile reaction products that adhere to the large surface area which exists in the matrix. Other phenomena might also conceivably be involved. The ultimate reaction appears to be expressible empirically as follows:

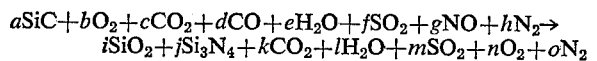
$$aSiC + bO_2 + cCO_2 + dCO + eH_2O + fSO_2 + gNO + hN_2 \rightarrow iSiO_2 + jSi_3N_4 + kCO_2 + lH_2O + mSO_2 + nO_2 + oN_2$$

This reaction does not purport to represent the intermediate reactions and products which would no doubt occur in a reaction between silicon carbide and gaseous combustion products at relatively high temperatures or in a range of temperatures.

To provide some indication of the efficacy of the new filter in removing nitrogen oxides from combustion or other hot gases, the data tabulated below is given. The tests from which the data derives involved a laboratory furnace which was fired with natural gas from a public utility system. A reactive filter made in accordance with the invention was located above the gas burner so that all combustion gases passed through the filter on the way to an exhaust stack. The filter matrix was horizontally disposed and comprised of silicon carbide granules about one inch in depth on an average. The largest granules, ranging from ⅜ to ½ inch were in the bottom layer and smaller particles of about ¼ inch were distributed on top. Temperature sensors and gas analyzer probes were located above and below the filter. The test data is given in Table 1 in which gas concentration is expressed in parts per million (p.p.m.). Pressure drop through the filter is expressed in inches of water. NOx stands for total nitrogen oxide and NO stands for nitric oxide.

TABLE I

| Run | 1 | 2 | 3 | 4 |
|---|---|---|---|---|
| Matrix temp | 2,200 | 2,185 | 2,105 | 2,115 |
| CO₂ } stack | 8.6 | 9.8 | 10.4 | 10.7 |
| O₂ } | 4.6 | 3.4 | 1.4 | |
| Pressure drop | | | 0.16 | 0.16 |
| Stack: | | | | |
| NO | 19.0 | 16.0 | 9.0 | |
| NOx | | 20 | 12 | 17 |
| Chamber: | | | | |
| NO | 65 | 87 | 78 | |
| NOx | | | 80 | 80 |

In various runs, matrix temperature in Fahrenheit degrees was maintained substantially constant. Various combustion rates or draft and fuel regulation were used so that the CO and $CO_2$ varied between runs. In all runs it is readily apparent that the total nitrogen oxides and the NO quantities in the stack gases after the filter were below the quantities of the same gases in the combustion chamber before the filter.

Tests have demonstrated that the reaction efficiency between the nitrogen oxide and silicon carbide is temperature dependent. Adsorption efficiency is very good when the gases and matrix are at about 2000° F. or higher which is common in gas or oil-fired furnaces. The upper operating temperature limit is preferably well below 3000° F. since merely heating air to this temperature produces NOx. It is also clear that the nitrogen oxide-silicon carbide reaction rate is in progress at temperatures well below 2000° F. and perhaps, even below 1000° F. although the reaction rate is evidently low.

It also appears that the presence of the silicon carbide matrix in the combustion process improves the over-all performance of apparatus in which heat is produced by burning solid or fluid hydrocarbons by permitting reduction of excess air and thereby improving combustion efficiency. The matrix tends to retard unburned carbonaceous and hydrocarbon volatiles which at prevailing temperature levels in the reactive filter and in the presence of an oxidizer complete the combustion process. In some cases, this contributes to maintaining the silicon carbide filter at a desirably high temperature.

Now that the rudiments of the new nitrogen oxides reactive filter have been outlined, it will be evident to those skilled in the art that the filter may be employed in various devices in which fuels are combusted at a relatively slow rate or when they are combusted spontaneously as in internal combustion engines and gas turbines. As examples, the new filter may be readily accommodated in any fired pipe of houshold or commercial hot air furnace or boiler by merely interposing it between the combustion chamber and the exhaust stack. It may also be used in gas and oil fired houshold and commercial hot water heaters. In hot water heaters, the filter may be interposed between the burner and the heat exchange surfaces in such manner that any radiated heat from the filter will be intercepted by the heat exchange surfaces so that conduction and convection of hot gases need not be relied upon exclusively to effect heat transfer. The filter might also be employed in waste incinerators.

In summary, the method and apparatus for removing undesirable gases, especially oxides of nitrogen, from hot gas streams by contact with silicon compounds has been described. The silicon compound is preferably silicon carbide which is inexpensive, readily available and subject to being appropriately configured for use in many devices which without the filter, would emit copious quantities of toxic and irritating gaseous combustion products to the atmosphere.

We claim:
1. A method of removing nitrogen oxides from a hot gas mixture comprising:
   (a) flowing the hot gas in direct contact with a surface consisting essentially of silicon carbide while maintaining the temperature of said silicon carbide at 1000° F. at least.
2. The method set forth in claim 1 including:
   (a) maintaining the temperature of said silicon carbide in the range of 1000° F. to 2200° F.
3. The method set forth in claim 1 including:
   (a) maintaining the temperature of said silicon carbide in the vicinity of 2200° F.
4. A method of removing nitrogen oxides from a gas mixture comprising:
   (a) conducting the mixture through a foraminous layer consisting essentially of silicon carbide while effecting direct contact between substantial proportions of said gas and the surface of said silicon carbide to thereby react the nitrogen oxides therewith while maintaining the temperature of said silicon carbide at 1000° F. at least.
5. The method set forth in claim 4 including:
   (a) creating said foramina with silicon carbide tubular elements which are bundled to provide said direct gas contact surfaces on the insides and outsides of said elements.
6. The method set forth in claim 4 wherein:
   (a) said foramina are created by silicon carbide granules and the gas flows through communication foramina between the granules.
7. The method set forth in claim 4 wherein:
   (a) said silicon carbide is of the beta type.

References Cited
UNITED STATES PATENTS

| | | | |
|---|---|---|---|
| 3,524,721 | 8/1970 | Stephens | 423—213 |
| 3,691,346 | 9/1972 | Dyre et al. | 423—214 |

EARL C. THOMAS, Primary Examiner

U.S. Cl. X.R.

423—212